United States Patent [19]

Deconinck

[11] 4,431,176
[45] Feb. 14, 1984

[54] DISPENSER FOR DISPENSING PHOTOGRAPHIC SHEETS FROM A STACK

[75] Inventor: Hugo F. Deconinck, Deurne-Zuid, Belgium

[73] Assignee: AGFA-Gevaert N.V., Mortsel, Belgium

[21] Appl. No.: 299,010

[22] Filed: Sep. 3, 1981

[30] Foreign Application Priority Data

Sep. 8, 1980 [GB] United Kingdom ............... 8028897

[51] Int. Cl.³ ............................................. B65H 3/06
[52] U.S. Cl. ...................................... 271/22; 271/25; 271/116; 271/119
[58] Field of Search ................... 271/19–25, 271/42, 115, 116, 128, 130, 119; 221/217, 259, 262

[56] References Cited

U.S. PATENT DOCUMENTS

| 815,905 | 3/1906 | Cox ........................................ 271/22 |
| 2,042,734 | 6/1936 | Roy ........................................ 271/21 |
| 3,325,164 | 6/1967 | Kedzierski ........................... 271/21 |

FOREIGN PATENT DOCUMENTS

| 1448296 | 6/1966 | France ................................. 271/21 |
| 42-23915 | 11/1967 | Japan ................................. 271/21 |

Primary Examiner—Bruce H. Stoner, Jr.
Assistant Examiner—James E. Barlow
Attorney, Agent, or Firm—William J. Daniel

[57] ABSTRACT

A dispenser for dispensing photographic sheets from a stack, comprising a dispensing mechanism including a bodily displaceable rotatably supported dispensing roller that is provided with uni-directional anti-rotation device, and a bodily stationary, driven roller for cooperation with the bodily displaceable roller.

5 Claims, 11 Drawing Figures

DISPENSER FOR DISPENSING PHOTOGRAPHIC SHEETS FROM A STACK

The present invention relates to a dispenser suitable for dispensing photographic sheets from a stack. The invention is more particularly concerned with a dispenser in the form of an unloader capable of unloading sheets from a stack holder in which the stack is arranged so that the holder together with the enclosed sheets can be repeatedly transferred to an exposure station for exposing the top sheet of the stack and then to the unloader for removal of that sheet and delivery thereof to a take-up point, e.g. for development of the exposed sheet.

The invention is particularly suitable for application in an unloader for a photographic sheet pack having an exposure opening on one side and sheet biasing means for biasing the stack of sheets bodily towards the exposure opening, sheet retaining means being provided along the periphery of the exposure opening for retaining the biased sheets, and wherein said sheet retaining means are interrupted at two positions located opposite to each other on parallel side-walls of the sheet pack so that the upper sheet may be uni-directionally buckled to facilitate its removal after exposure. A sheet pack of the described type is disclosed in our co-pending application entitled: "A container suitable for holding a stack of photographic sheets", Ser. No. 299,012 now U.S. Pat. No. 4,388,992 filed on even day herewith, and corresponding with the British convention Application No. 30/28898 filed on Sept. 8, 1980.

The uni-directional buckling of the upper sheet of a stack may be achieved by means of sucker cups that engage the exposed surface of the upper sheet and that may lift the sheet by causing it to buckle. It has been shown that the withdrawal of the upper sheet from the next sheet of a sheet pack may require the application of a negative or suction pressure for the sucker cups that is so large that the upper sheet becomes buckled at the location of the sucker cups to such an extent that a substantial risk exists for the buckled sheet portions to act as a sucker cup on the next sheet so that two, or even more, sheets are simultaneously removed from the sheet pack.

The uni-directional buckling of the upper sheet may be caused by means of a roller that subjects the exposed surface of the upper sheet to rearward and forward drive forces. Known mechanisms comprise drive means for rotating such roller, and they are complicated by the necessity for such drive means to be able to follow the bodily displacements of such roller. An embodiment of such mechanisms is disclosed in FR-P No. 1,552,327.

It is the aim of the present invention, to provide a sheet dispenser of simple construction, that operates reliably and that does not require precise adjustments.

According to the present invention, a dispenser for dispensing photographic sheets from a stack, comprising a stack-receiving and locating facility means, and a dispensing mechanism with a bodily displaceable roller for frictionally engaging the sheet which is next to be dispensed from the stack and exerting on such sheet a force causing buckling of a sheet portion and for moving a released end of the sheet upwardly into the nip formed by the dispensing roller and a co-operating, driven roller, thereby to feed the sheet from the stack, is characterized is that the bodily displaceable roller can be swung about an axis that runs transversely with respect to the feeding direction of the sheets, that this roller is freely rotatable and is provided with uni-directional locking means that permits free rotation of the roller as the latter is swung towards the upper sheet and becomes biased against such sheet, but locks rotation of the roller when it is subsequently swung away from the sheet, thereby to produce the buckling of the sheet and the upward displacement of one of its end, and that co-operating rotatably driven roller is bodily stationary.

The improvement according to the present invention has the advantage that the sheet gripping roller is a passive member that requires no external driving or special control to buckle and lift one end of the upper sheet from a stack. The rotation of this roller to direct the sheet end into the nip it forms with the co-operating driven roller, results from its co-operation with the driven roller. This rotation may suitably be performed by the frictional peripheral contact between both rollers, but it is also possible to provide both rollers with gear wheels that may engage each other at the moment the swingeable roller takes a position against the driven, bodily stationary roller.

The dispenser may be arranged for receiving a sheet stack in the form of a sheet pack. The disperser may also be arranged for receiving a sheet pack fitted in a pack holder with a dark slide. In this way, the light-tight insertion and withdrawal of the sheets from the dispenser may occur most easily. The pack holder may also form an adapter for the proper positioning of the sheet pack in a camera. Finally, the sheet pack may be integral with the pack holder.

The invention will hereinafter be described by way of example with reference to the accompanying drawings wherein.

Figure 1A:
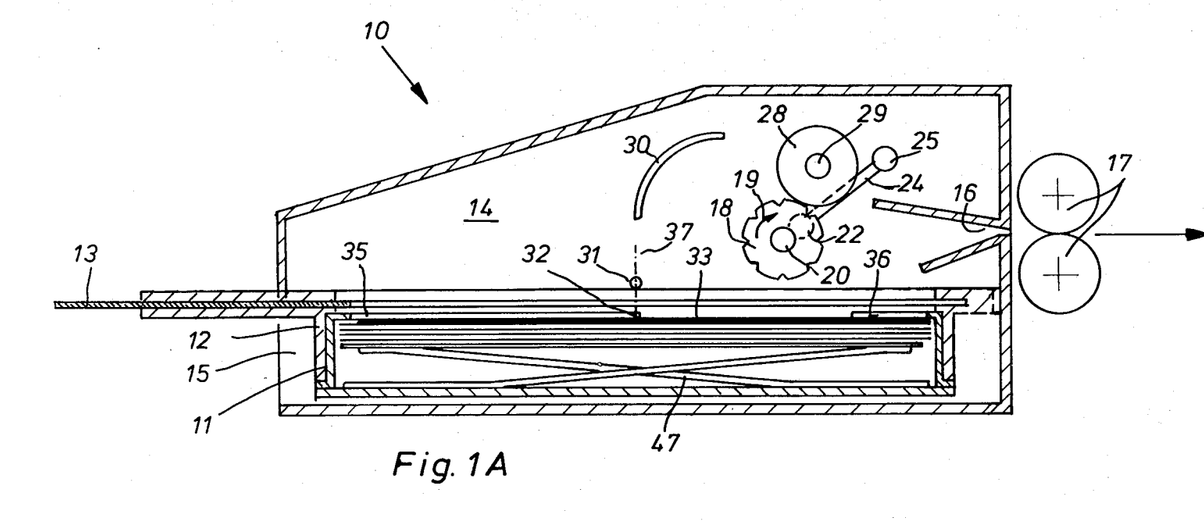
FIGS. 1A to 1H are diagrammatic illustrations of one embodiment of a dispenser according to the invention, at successive stages of operation on a sheet pack.

Referring to FIG. 1A, there is shown a dispenser 10 for unloading a photographic sheet pack 11 that is fitted into a pack holder 12. The pack holder is provided with a dark slide 13 for the light-tight shielding of the contents of the sheet pack during the transport of the pack from a camera where the upper sheet of the pack has been image-wise exposed, to the unloader. More details of the particular sheet pack that is used in the present dispenser are set forth with reference to FIGS. 2 and 3.

To avoid encumbering of the figures, the pack holder 12 has been illustrated only in FIG. 1A in cross-section. In FIGS. 1B to 1H, on the contrary, the pack holder has been illustrated in broken lines to better illustrate the several operative positions of the unloading mechanism.

Further, in order to clarify the figures, the upper sheet of the stack of sheets has been drawn in a darkened or heavy line.

The dispenser illustrated in FIG. 1A comprises a light-tight housing 14 with an inlet opening 15 for the sheet pack and an outlet opening 16 for a sheet dispensed from the pack. The inlet opening is arranged in such a way that it is light-tightly closed as the pack is completely inserted in the dispenser, and the outlet opening may light-tightly communicate with a device provided with transport means, such as the roller pair 17, for the further transport of the withdrawn sheet, and with means for the photographic processing of the sheet.

Figure 1B:
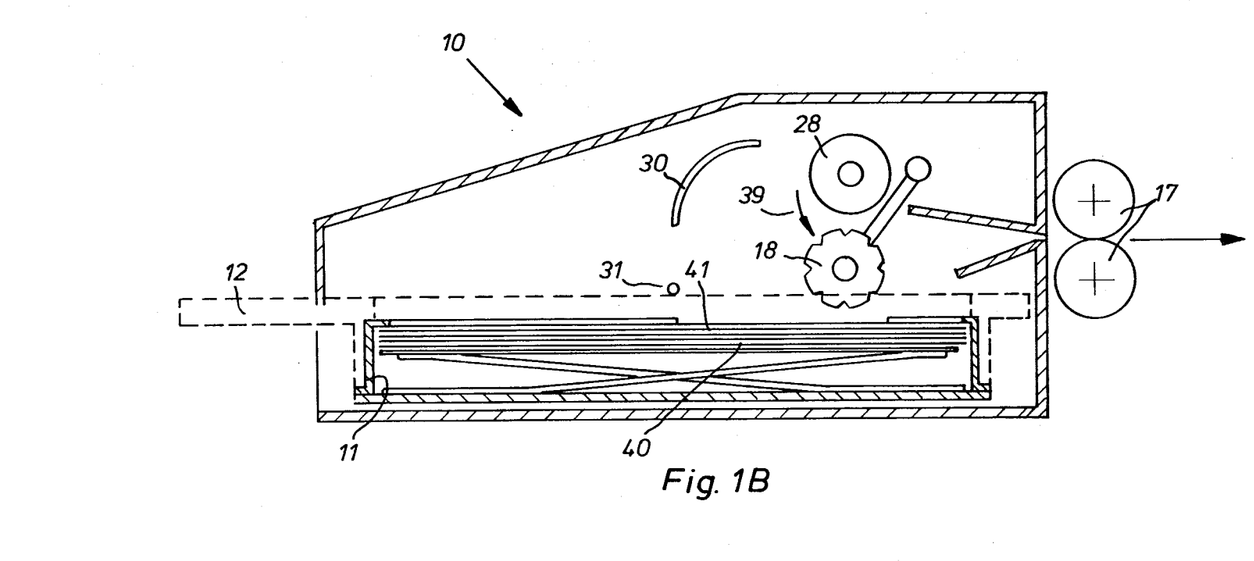
Figure 1C:
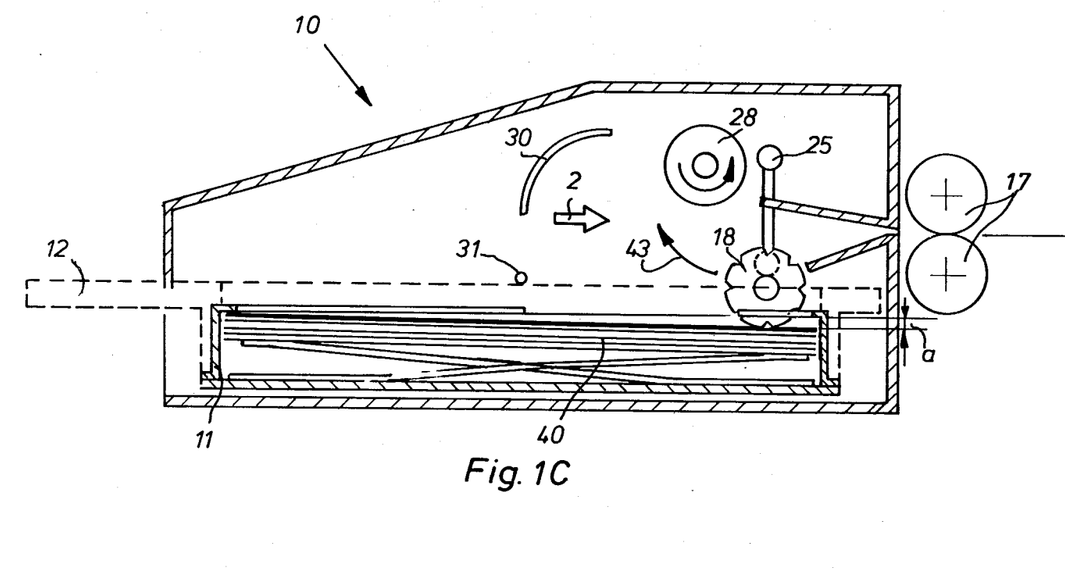
Figure 1D:
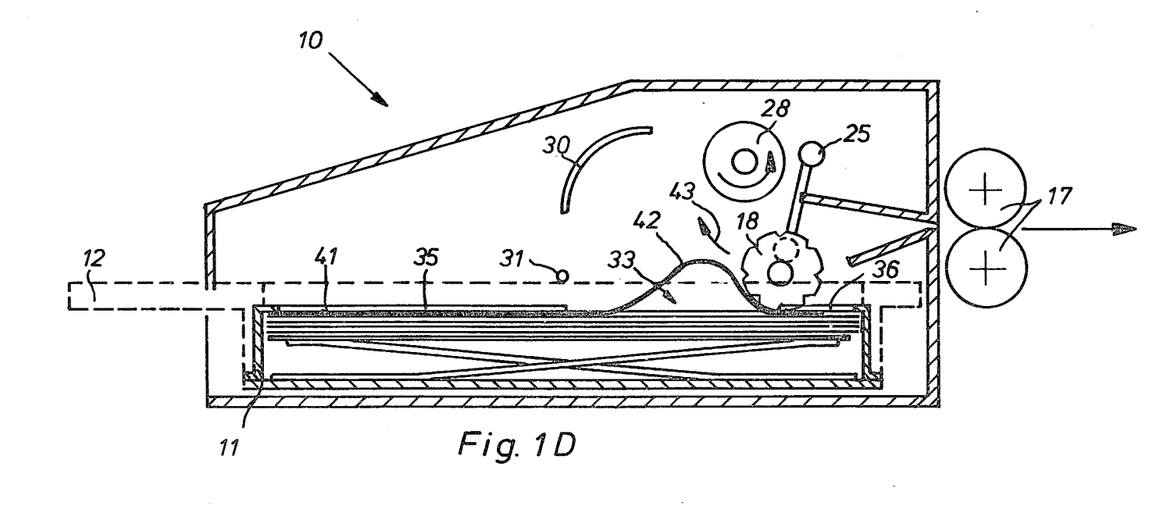
Figure 2:
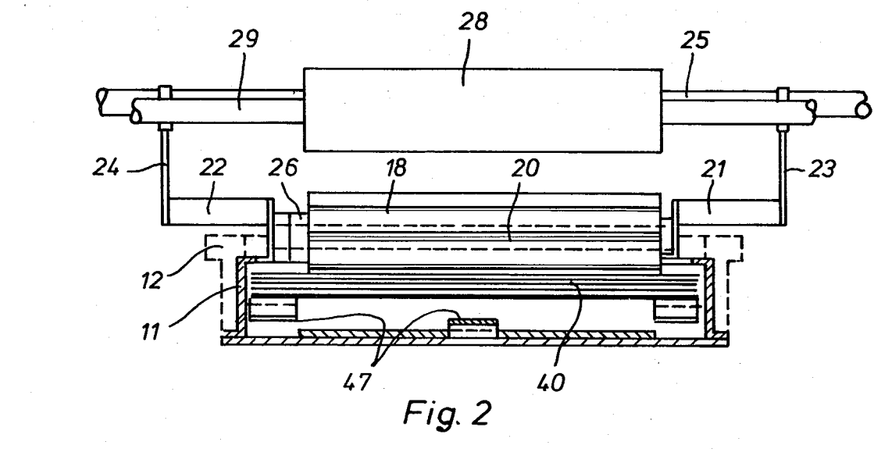
FIG. 2 is a diagrammatic horizontal view in the direction of the arrow 2 of FIG. 1C with the casing and certain components removed.

The dispensing mechanism comprises a roller 18 that is mounted for free rotation only in the direction of the arrow 19, by means known in the art such as a pawl and ratchet mechanism, or the like, represented schematically by the block 26 in FIG. 2 which is a view according to the arrow 2 of FIG. 1C. Roller 18 is shorter in length than the width of the exposure opening of the sheet pack, and is rotatably journalled on a shaft 20 the free ends 21, 22 of which are upwardly offset to permit the access of the roller through the opening of the sheet pack onto the upper sheet. The extremities of the shaft ends 21, 22 are fitted to the parallel arms 23 and 24 that extend from a pivotable shaft 25 arranged transversely of the apparatus and controlled in the way as will be described further.

The roller 18 has a covering the coefficient of friction of which with respect to the upper surface of the sheets of the pack is greater than the coefficient of friction between the mutual sheets of the pack. A suitable covering for the roller is a layer of rubber or the like. The peripheral surface of the roller may be provided with a plurality of grooves extending parallel with the axis of the roller, and having a width and a depth of some tenths of a millimeter. The purpose of these grooves will be explained later. The dispenser comprises further a bodily stationary roller 28 with a shaft 29 that may be rotated at a uniform speed by motor means, not illustrated. The roller 28 may have a smooth peripheral surface, with a coefficient friction that with respect to the roller 18 is not critical. The dispenser comprises further a sheet-buckle arresting plate 30 and an anti-buckling member in the form of a rod 31 that extends closely over the opening of the sheet pack, and the position of which coincides approximately, as indicated by the vertical dash and dot line 37, with the end 32 of the interruption 33 of the sheet retaining means 35, 36 or the sheet pack (see FIG. 4).

The dispenser is in the inoperative position as illustrated in FIG. 1A, and after the sheet pack is properly inserted in the dispenser, the unloading cycle is started. This starting may occur either manually by means of a start button actuated by the operator, or by means of a sensor that is responsive to the complete insertion of the pack holder. Additional sensing means may be provided for signalling the proper opening of the dark slide 13.

Drive means, not illustrated, causes the shaft 25 to rock whereby roller 18 is swung downwardly in the direction of the arrow 39, see FIG. 1B. As soon as the roller contacts the upper sheet 41 of the stack 40 of sheets, the roller starts to rotate about its axis as a consequence of its rolling over the upper sheet. At the same time the roller may displace the stack of sheets slightly downwardly so that, at least at the sheet end portion that is situated at the right-hand side according to the figure, the contact between the sheet retaining means 35, 36 and the upper sheet may be broken, as indicated by the distance a, see FIG. 1C, wherein also the lowermost position of the roller 18 is illustrated.

The shaft 25 is then rocked bacwardly, as indicated by the arrow 43 in FIG. 1C, whereby the roller 18, the rotation of which is now blocked by the uni-directional locking mechanism 26 (see FIG. 2), operates as a friction member that urges the engaged end portion of the sheet 41 in the direction of the opposite sheet end portion at the entrance side of the apparatus. The compression forces that are created thereby in the sheet make the sheet tend to buckle and actually a sheet buckle 42 will be formed, see FIG. 1D, at the zone where the sheet is free to do so, namely at the interruptions 33 and 34 of the sheet retaining means 35 and 36, see also FIG. 4.

Figure 1E:
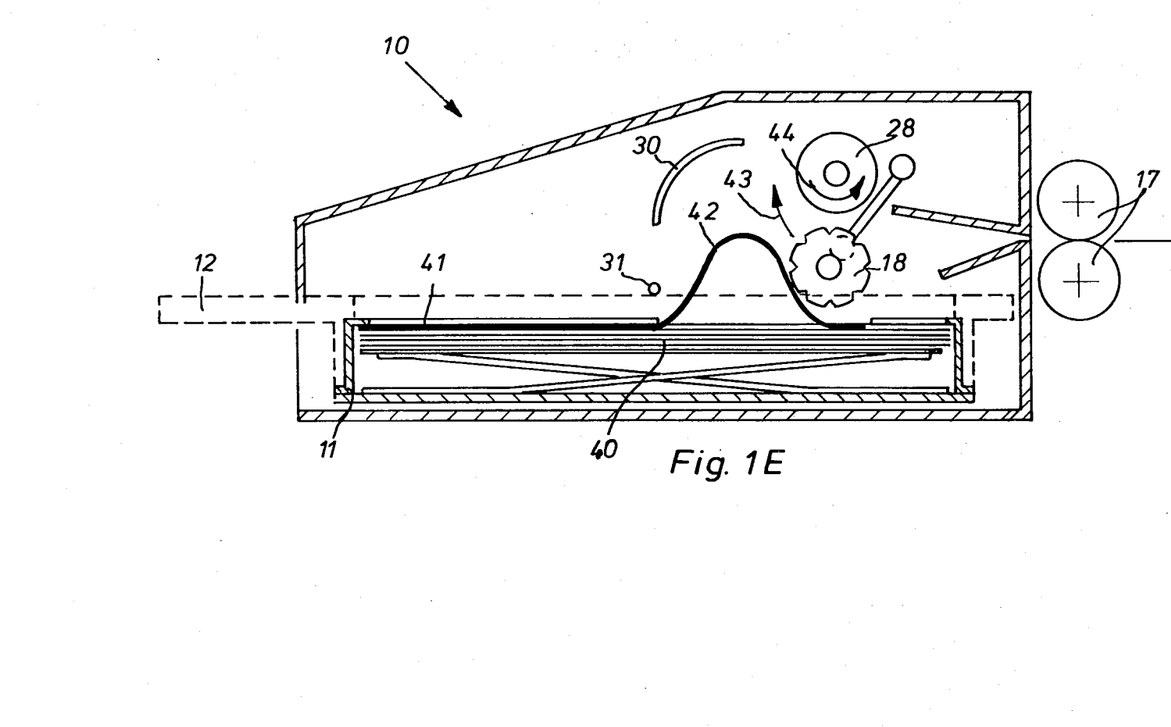

Further bodily displacement of the roller 18 in the direction of the arrow 43 causes the size of the buckle 42 to increase, see FIG. 1E. It should be noted that the representation of the sheet buckle in this figure, as well as in all other figures of the present specification, is based on observations of the actual behaviour of the sheet during the dispensing operations.

Meanwhile, the drive means for the stationary roller 28 has been actuated so that roller is rotating in the direction indicated by the arrow 44. The end of the upward displacement of the roller 18 is determined by the contact of the roller 18 with the roller 28, see FIG. 1F. At that very moment, the roller 18 is put into rotation by its contact with the roller 28, as indicated by the arrow 45, so that the sheet buckle 42 will further increase in size until it abuts against the sheet-buckle arresting plate 30.

Figure 1F:
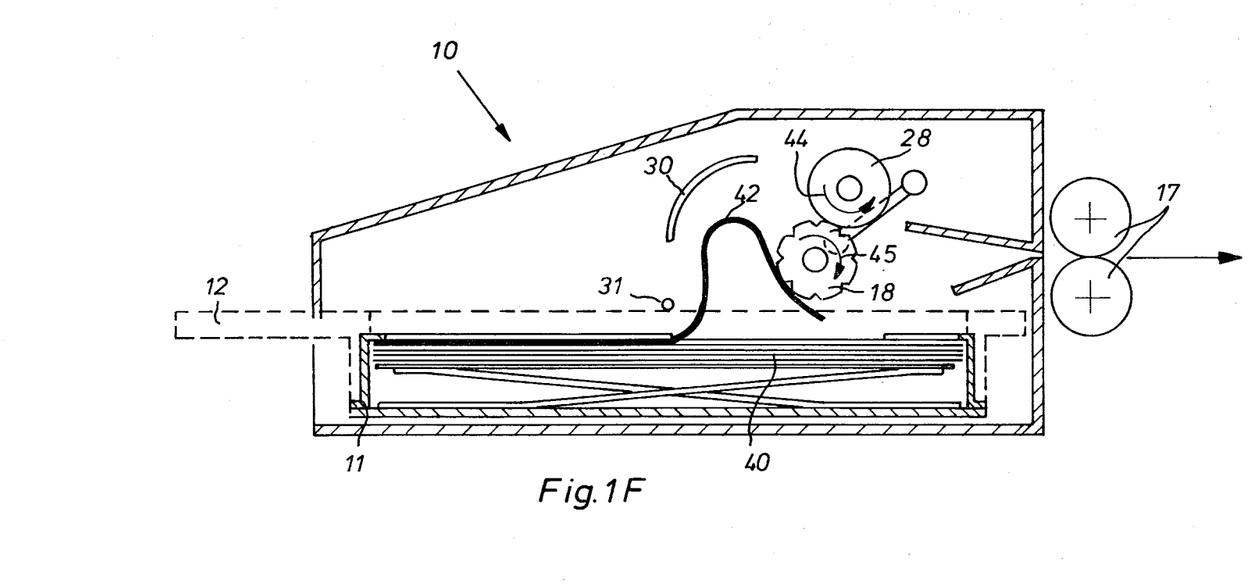
Figure 1G:
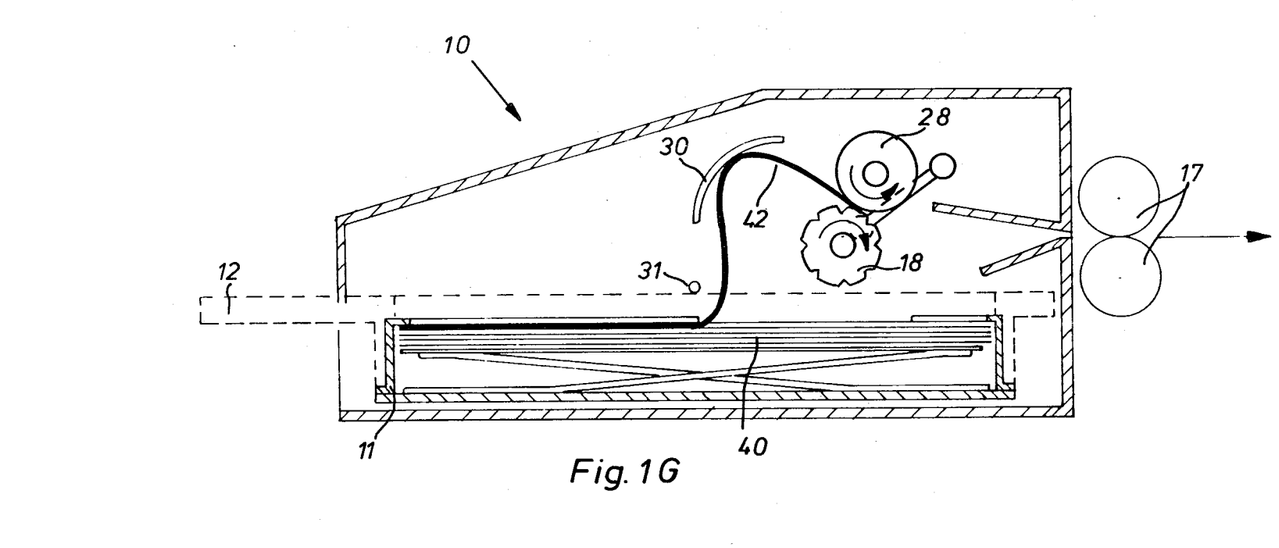
Figure 1H:
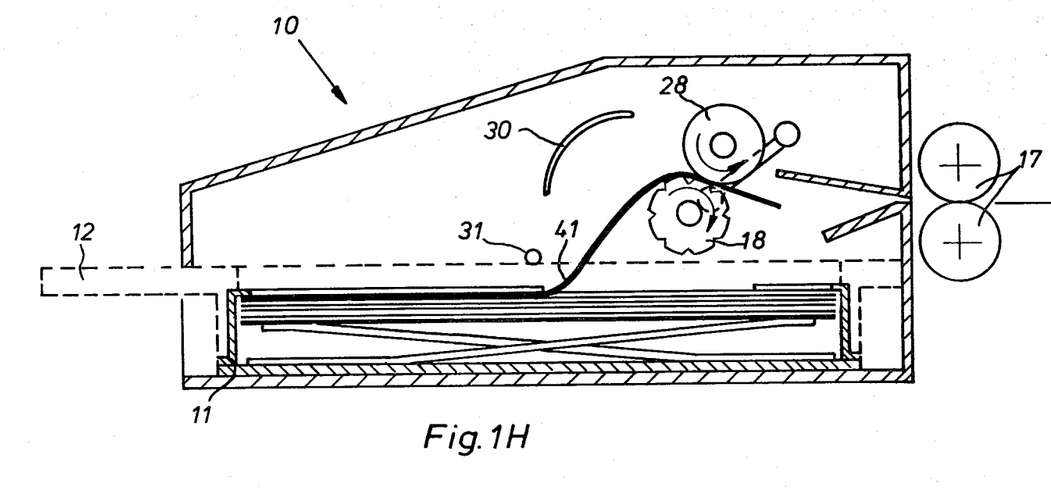

The position of this plate with respect to the rollers 18 and 28 is such that the free end portion of the buckle, i.e. the sheet end portion that extends forwardly beyond the contact area with the plate, is longer than the distance between the plate and each of the rollers.

As a consequence thereof, and since the free sheet end portion is firmly forwardly biased by the elasticity of the sheet that tends to flatten the buckle produced in the sheet, the leading sheet edge maintains firm contact with its periphery of roller 18 during the displacement from a position below to a position just above said roller. The positive displacement of the leading sheet end portion by contact of the sheet edge with the roller 18 may be improved if the peripheral roller surface is provided with a plurality of small axially running grooves, as at x, as mentioned already, so that the leading sheet edge may catch in such groove. The released leading sheet end portion finally jumps into the nip between the rollers as illustrated in FIG. 1C. Drive roller 28 now engages the sheet and withdraws it from the sheet pack 11 (see FIG. 1H). The roller pair 17 takes over the sheet transport as the trailing sheet edge passes from between the rollers 18 and 28. Timing means or appropriate switch means may control the driving of roller 28 so that rotation of said roller is arrested as the withdrawn sheet leaves the dispenser.

The sheet of photographic material that has been removed by the dispenser may be conveyed to a photographic processing apparatus for bringing about an image of the exposed sheet.

The function of the anti-buckling member 31 is as follows. At the instant the buckle 42 in the upper sheet is being formed, that when the sheet moves from the position of FIG. 1C to the position of FIG. 1D, it may happen that the sheet does not buckle uni-directionally as illustrated, i.e. transversely with respect to the dispenser, but that the sheet buckles also in a direction which is normal or almost normal thereto, i.e. longitudinally with respect to the apparatus. This deviant buckle formation impedes or prevents the desired transverse buckling of the sheet. It has been found that a member shaped as the rod 31 that is mounted closely over the sheet surface and extends transversely of the sheet pack at a position that is located about half-way the length of the sheet pack, preferably situated at the place of the interruption in the sheet retaining means where the buckle terminates, that is at the position indicated by the line 37 in FIG. 1A, effectively prevents the formation of undesired sheet buckles. If such undesired buckle tends to develop, as during the change in the sheet position from FIG. 1C to FIG. 1D where the central zone of the sheet may tend to buckle upwardly, suchlike buckle formation is arrested by the contact of the sheet with the rod 31. Further growth of the buckle 42 causes the first, undesired buckle to collapse so that the sheet resumes a smooth and flat position at that place.

The type of sheet pack to be unloaded by the dispenser according to the invention and the use of said pack, is explained in detail hereinafter with reference to FIGS. 3 and 4.

Figure 3:
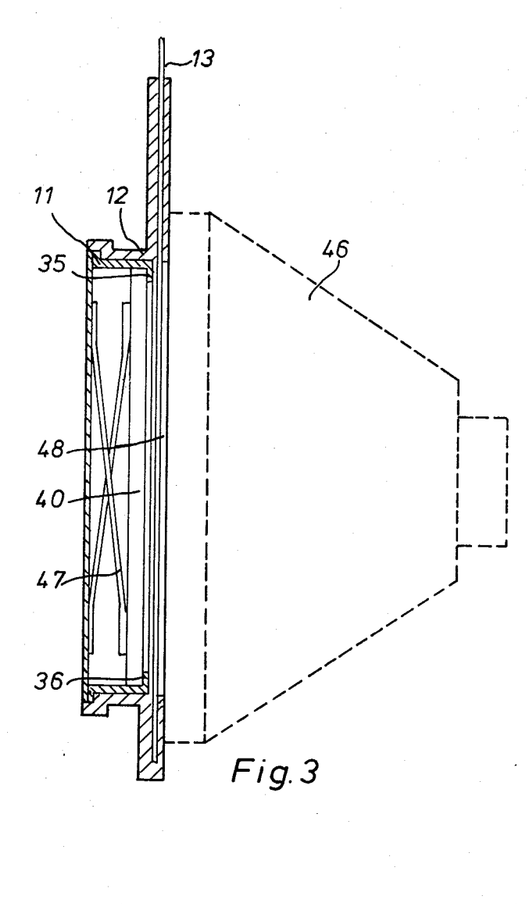
FIG. 3 is a cross-sectional view of sheet pack that may be unloaded by the disperser according to FIGS. 1A to 1H, in an exposure position with the camera indicated in dotted lines.
Figure 4:
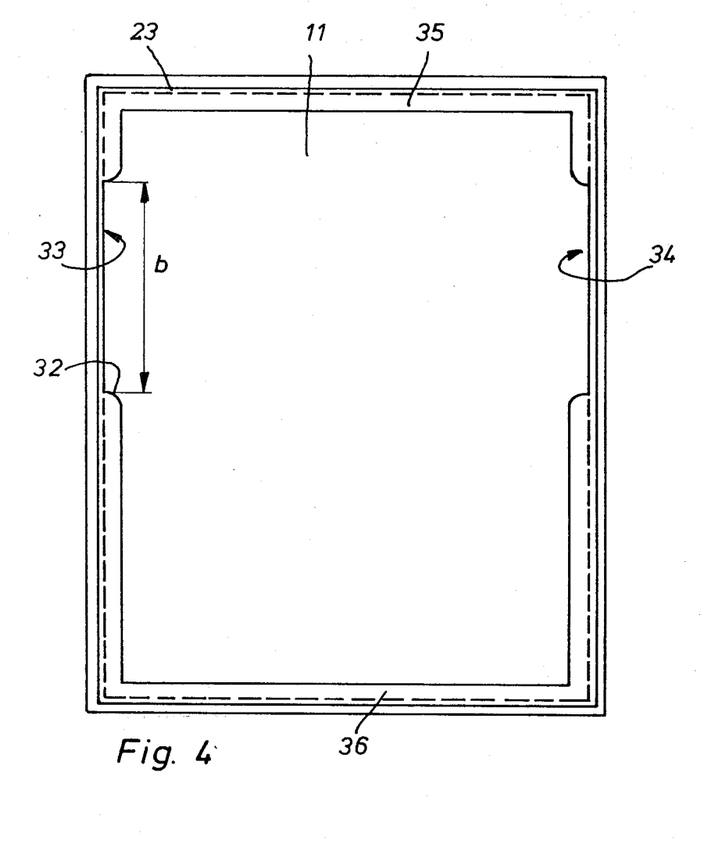
FIG. 4 is a plan view of the sheet pack.

Referring to FIG. 3, the rectangular sheet pack 11 is light-tightly inserted into the corresponding rectangular opening of a pack holder 12 that is arranged for attachment to the rear-side of a photographic camera 46, illustrated in broken lines. The sheet pack 11 may be arranged for clampingly fitting in the holder 12, but the pack 11 may also be provided with springlike fingers, pivotable clips or the like, for holding the pack well in place in the holder.

The camera 46 may be a professional or semi-professional type camera for making passport photographs, studio exposures for the production of lay-outs, etc. The dark slide 13 of the pack holder is withdrawn from the exposure opening of the sheet pack when a sheet exposure is to be made. After the exposure, reclosing of the slide permits the removal of the pack holder with the sheet pack from the camera in daylight conditions, and the transfer thereof to an unloader for removal of the exposed upper sheet of the pack.

The sheet pack 11 comprises a stack 40 of sheets that are biased by spring means 47 in the direction of the rectangular exposure opening 48 of the pack. The sheets are withheld by sheet retaining means in the form of inwardly projecting peripheral flanges 35 and 36 that have a U-shaped form, with the openings of the U's facing each other. The distance between the opposite extremities of legs of the U's 35 and 36 is indicated by b, see FIG. 4, the outline of a sheet being indicated by the broken lines. The distance b defines the interruption of the peripheral retaining border for the sheet material. The interruptions have been indicated by the numerals 33 and 34, and they provide the space that is required for the buckling of the upper sheet of the stack of sheets.

In the description of an embodiment of the invention, reference has been made to a photographic sheet pack that was contained in a pack holder. This pack holder was moreover provided with a dark slide to enable the daylight operation of the unloader. It will be understood that the dispenser according to the invention may be also arranged for the treatment of sheet packs that are not fitted in a pack holder. Also the dispenser may be arranged for receiving stacks of sheets that are not arranged in a pack, but that consist simply of a pile of a number of sheets.

Finally, the dispenser according to the present invention may be arranged to handle stacks of sheets of different formats. To that end, a number of modules may be provided of equal outer dimensions, that may interchangeably light-tightly fit in the dispenser, at the place of the pack holder 12 illustrated in the drawings. Each module will have an inlet opening that matches with a defined format of sheets, so that by the fitting of a particular module in the dispenser, the apparatus is readily adapted to receive the corresponding sheet format for treatment.

In case the differences in sheet formats become too considerable, the sheet dispensing mechanism of the dispenser may be arranged for taking different longitudinal or transverse positions, thereby to occupy the correct position with respect to the sheet stack to be unloaded.

The dispenser according to the invention may be used for dispensing film as well as paper sheets from the appropriate stacks of sheets. Selection of the characteristics of the sheet dispensing mechanism notably its coefficient of friction and its sheet biasing force, depend on the stiffness, the mutual friction and the occasional biasing of the sheets.

I claim:

1. A dispenser for dispensing photographic sheets from a stack, comprising a stack-containing and locating unit and a dispensing mechanism for removing the upper sheet from the stack, said mechanism comprising a bodily displaceable roller movable from a transporting position to a buckling position for frictionally engaging the upper sheet of the stack and exerting on such sheet a force causing buckle of a sheet portion and from buckling position to transporting position while carrying a free end of the sheet upwardly, a stationary co-operating, rotatably driven roller defining with the displaceable roller when in transporting position a roller nip for receiving the upwardly carried free sheet end and transporting the same from said unit, means supporting the bodily displaceable roller for free rotation about its axis and bodily pivotal movement about an axis that runs transversely with respect to the feeding direction of the sheets to and from said positions, uni-directional anti-rotation means associated with said displaceable roller for permitting free rotation of the roller as the latter is swung into buckling position, and that prevents rotation of said roller as the roller is subsequently pivoted to transport position, thereby to frictionally engage a portion of the sheet and produce the buckling of the sheet and the upward displacement of said one end of the sheet.

2. Dispenser according to claim 1, wherein in said transport position said displaceable roller is rotatably driven in the direction of its free rotation by frictional peripheral contact with the driven stationary roller.

3. A dispenser according to claim 1, wherein said stack-receiving unit is provided with sheet stack spring biasing means for resiliently supporting the sheet stack for yielding movement under the contact of the displaceable roller.

4. A dispenser according to claim 1, wherein said bodily displaceable roller is provided around its peripheral surface with a plurality of grooves extending parallel to the roller axis.

5. A dispenser according to claim 1, comprising an elongated anti-buckling member that extends in close proximity over the surface of the upper sheet of the stack of sheets, and in a direction that is transverse with respect to the dispensing direction.

* * * * *